US011375520B2

(12) United States Patent
Inohiza

(10) Patent No.: US 11,375,520 B2
(45) Date of Patent: Jun. 28, 2022

(54) COMMUNICATION APPARATUS, COMMUNICATION METHOD, AND NON-TRANSITORY COMPUTER-READABLE STORAGE MEDIUM

(71) Applicant: CANON KABUSHIKI KAISHA, Tokyo (JP)

(72) Inventor: Hirohiko Inohiza, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/658,707

(22) Filed: Oct. 21, 2019

(65) Prior Publication Data
US 2020/0137772 A1    Apr. 30, 2020

(30) Foreign Application Priority Data
Oct. 29, 2018   (JP) .............................. JP2018-203251

(51) Int. Cl.
*H04W 72/12*   (2009.01)
*H04L 5/00*    (2006.01)
*H04W 84/12*   (2009.01)

(52) U.S. Cl.
CPC ......... *H04W 72/121* (2013.01); *H04L 5/0007* (2013.01); *H04L 5/0037* (2013.01); *H04W 72/1252* (2013.01); *H04W 72/1268* (2013.01); *H04W 72/1284* (2013.01); *H04W 84/12* (2013.01)

(58) Field of Classification Search
CPC ............. H04W 72/0446; H04W 88/08; H04W 72/0453; H04W 24/00; H04W 72/121; H04W 72/1252; H04W 72/1268; H04W 72/1284; H04L 5/0007; H04L 5/0037
USPC ........................................................ 370/330
See application file for complete search history.

(56) References Cited

U.S. PATENT DOCUMENTS

| 8,031,655 | B2 * | 10/2011 | Ye ..................... | H04W 72/1284 370/328 |
| 8,526,389 | B2 * | 9/2013 | Dinan ............... | H04W 56/0045 370/329 |
| 8,630,202 | B2 * | 1/2014 | Kim .................. | H04W 72/1284 370/252 |
| 8,953,459 | B2 * | 2/2015 | Shi .................... | H04W 72/1284 370/241 |
| 9,544,914 | B2 * | 1/2017 | Azizi ..................... | H04L 1/0006 |
| 10,154,520 | B1 * | 12/2018 | Hedayat ........... | H04W 74/0833 |
| 10,178,673 | B1 * | 1/2019 | Jiang ..................... | H04L 5/0051 |
| 10,420,010 | B2 * | 9/2019 | Wang .................... | H04W 16/26 |
| 10,880,924 | B2 * | 12/2020 | Ahn ....................... | H04W 74/08 |
| 2010/0177669 | A1 * | 7/2010 | Suo ........................ | H04L 5/0053 370/280 |

(Continued)

*Primary Examiner* — Peter G Solinsky
*Assistant Examiner* — Sanjay K Dewan
(74) *Attorney, Agent, or Firm* — Rossi, Kimms & McDowell LLP

(57) ABSTRACT

A communication apparatus obtains, from each of a plurality of other communication apparatuses, an amount of buffered data of the each of the plurality of other communication apparatuses, divides the plurality of other communication apparatuses into a plurality of groups based on the amount of buffered data of each of the plurality of other communication apparatuses, and assigns to each of the groups wireless frequency resources for which a shared data communication time is set.

15 Claims, 16 Drawing Sheets

(56) References Cited

U.S. PATENT DOCUMENTS

| | | | | |
|---|---|---|---|---|
| 2013/0028201 A1* | 1/2013 | Koo | ............... | H04W 72/1215 |
| | | | | 370/329 |
| 2013/0100908 A1* | 4/2013 | Xu | ............... | H04W 28/12 |
| | | | | 370/329 |
| 2013/0107722 A1* | 5/2013 | Huang | ............... | H04W 28/12 |
| | | | | 370/241 |
| 2013/0114445 A1* | 5/2013 | Wen | ............... | H04W 24/10 |
| | | | | 370/252 |
| 2013/0308592 A1* | 11/2013 | Kitou | ............... | H04W 24/10 |
| | | | | 370/329 |
| 2014/0119333 A1* | 5/2014 | Hedlund | ............... | H04L 5/0007 |
| | | | | 370/330 |
| 2014/0126399 A1* | 5/2014 | Damnjanovic | ............... | H04W 24/10 |
| | | | | 370/252 |
| 2015/0365203 A1* | 12/2015 | Suh | ............... | H04L 5/0048 |
| | | | | 370/330 |
| 2016/0352552 A1* | 12/2016 | Liu | ............... | H04L 5/0053 |
| 2017/0013640 A1* | 1/2017 | Loehr | ............... | H04W 76/14 |
| 2017/0086212 A1* | 3/2017 | Kim | ............... | H04L 1/1664 |
| 2017/0196018 A1* | 7/2017 | Zeng | ............... | H04W 72/042 |
| 2018/0020428 A1* | 1/2018 | Madhavan | ............... | H04W 72/042 |
| 2018/0132245 A1* | 5/2018 | Yerramalli | ............... | H04W 72/0473 |
| 2019/0132863 A1* | 5/2019 | Hong | ............... | H04W 48/06 |
| 2019/0150025 A1* | 5/2019 | Ohta | ............... | H04W 28/0278 |
| | | | | 370/329 |
| 2019/0150187 A1* | 5/2019 | Park | ............... | H04W 72/1273 |
| | | | | 370/330 |
| 2019/0261310 A1* | 8/2019 | Martin | ............... | H04W 72/0446 |

* cited by examiner

| AID | Queue size | MCS INDEX | COMMUNICATION TIME |
|---|---|---|---|
| 1 | 2 | 1 | 8 |
| 2 | 8 | 3 | 16 |
| 3 | 1 | 1 | 4 |
| 4 | 2 | 1 | 8 |
| 5 | 3 | 1 | 12 |
| 6 | 4 | 1 | 16 |
| 7 | 3 | 1 | 12 |
| 8 | 8 | 3 | 16 |
| 9 | 1 | 1 | 4 |
| 10 | 2 | 0 | 16 |
| 11 | 1 | 0 | 8 |
| 12 | 2 | 0 | 16 |
| 13 | 1 | 1 | 4 |
| 14 | 3 | 1 | 12 |
| 15 | 2 | 3 | 4 |
| 16 | 2 | 3 | 4 |
| 17 | 3 | 1 | 12 |

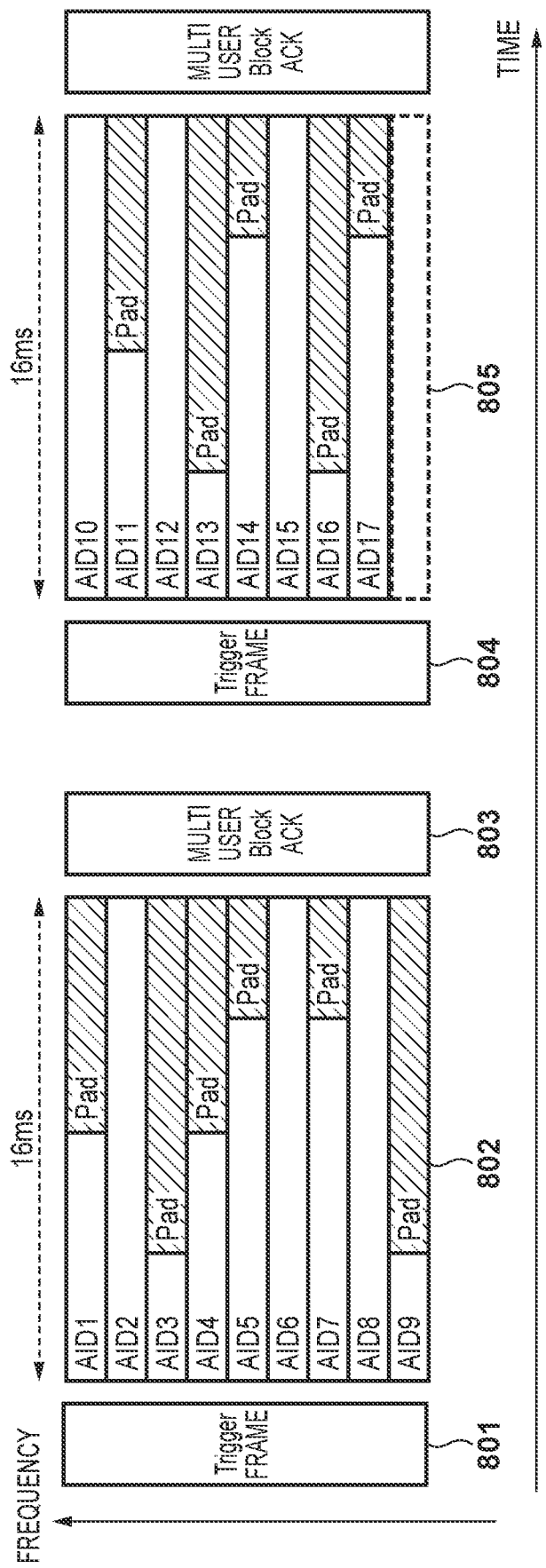

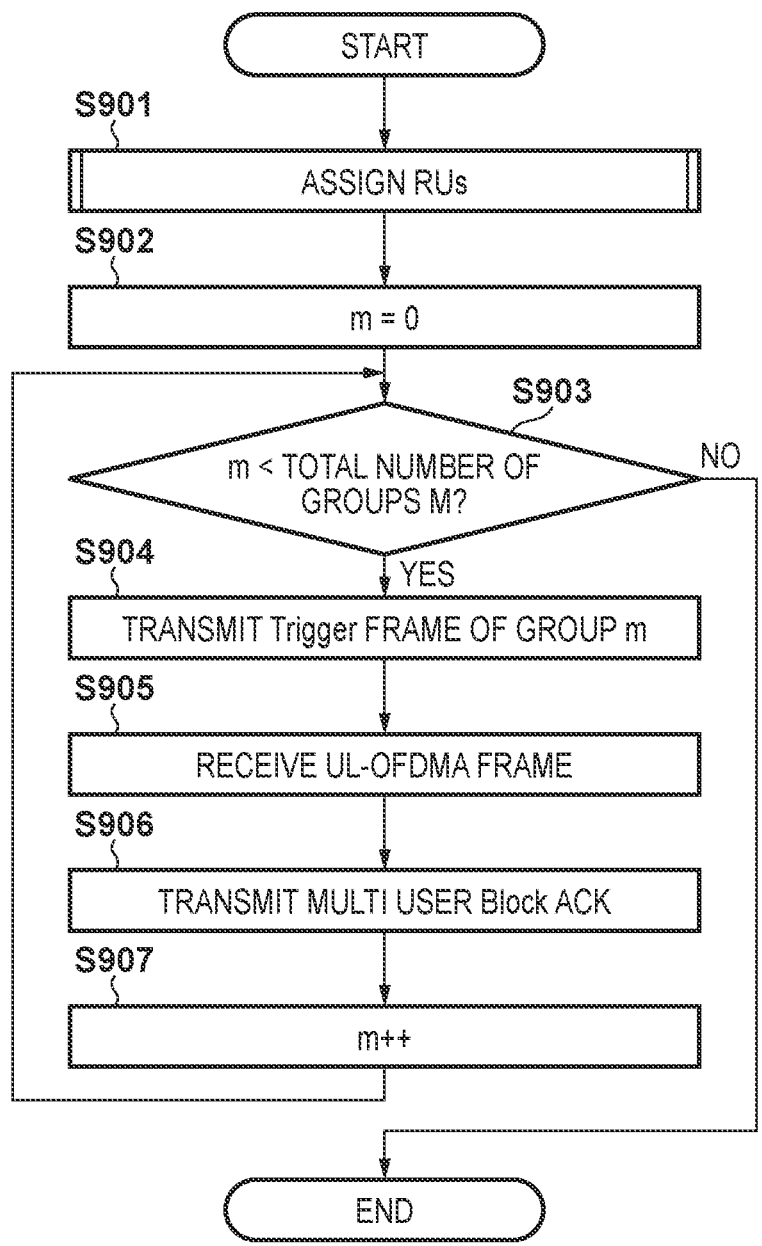

F I G. 13

| AID | Queue size | MCS INDEX | COMMUNICATION TIME |
|---|---|---|---|
| 1 | 2 | 1 | 8 |
| 2 | 10 | 3 | 20 |
| 3 | 1 | 1 | 4 |
| 4 | 2 | 1 | 8 |
| 5 | 3 | 1 | 12 |
| 6 | 4 | 1 | 16 |
| 7 | 3 | 1 | 12 |
| 8 | 8 | 3 | 16 |
| 9 | 1 | 1 | 4 |
| 10 | 2 | 0 | 16 |
| 11 | 1 | 0 | 8 |
| 12 | 2 | 0 | 16 |
| 13 | 1 | 1 | 4 |
| 14 | 3 | 1 | 12 |
| 15 | 2 | 3 | 4 |
| 16 | 2 | 3 | 4 |
| 17 | 3 | 1 | 12 |

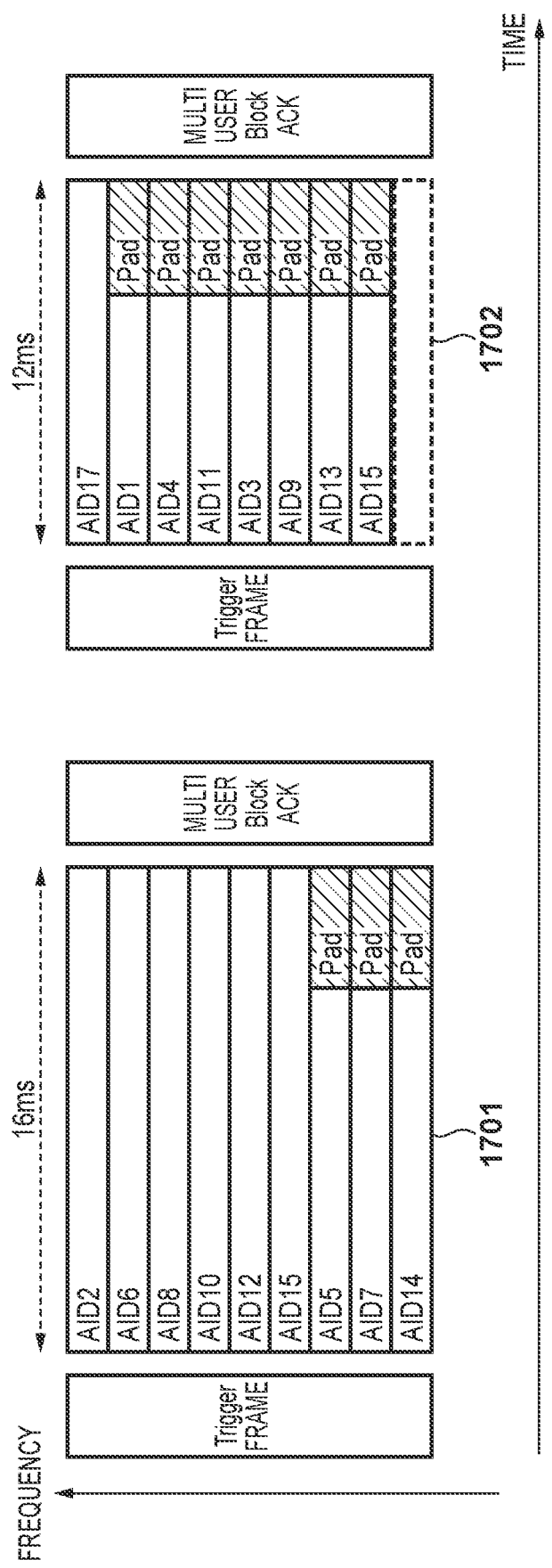

COMMUNICATION APPARATUS, COMMUNICATION METHOD, AND NON-TRANSITORY COMPUTER-READABLE STORAGE MEDIUM

BACKGROUND OF THE INVENTION

Field of the Invention

The present invention relates to a technique for assigning resources for UL-OFDMA.

Description of the Related Art

IEEE (Institute of Electrical and Electronics Engineers) is investigating IEEE 802.11ax as a High-efficiency (HE: High Efficiency) next-generation wireless LAN standard. In IEEE 802.11ax, employment of OFDMA has been proposed, which, in order to improve frequency utilization efficiency, enables the assignment of a structure of frequency channels that are conventionally used in units of a frequency bandwidth of 20 MHz to a plurality of terminals in units of a narrower frequency bandwidth. Note that OFDMA is an acronym for Orthogonal Frequency Division Multiple Access and is a multi user communication system that multiplexes signals of a plurality of users.

In IEEE 802.11ax, at least a portion of a 20 MHz wide frequency band is assigned to a maximum of nine stations (STA hereinafter) by OFDMA. For example, in a case where the number of STAs is 1, all of the 20 MHz wide frequency band may be assigned to the STA, while in a case where the number of STAs is 2 or more, an RU (Resource Unit, a unit that groups a plurality of subcarriers) which is a wireless frequency resource unit in the 20 MHz wide frequency band is assigned to each STA.

When an Access Point (AP hereinafter) assigns an RU for UL (Up Link: data communication from an STA to an AP)-OFDMA, a Trigger frame is used (specification of US-2017-0086212). For example, the AP derives a transmission time of each STA by obtaining information regarding a transmission buffer amount from each STA, and sets the longest transmission time from among the transmission times of each STA to a data communication time shared by all the STAs. Then, the AP stores information of the data communication time shared by all the STAs in a Trigger frame, and notifies the information to each of the STAs.

Each of the STAs that received the Trigger frame from the AP transmits their own data at the communication time shared by all the STAs based on the information included in the frame. Here, when a data transmission time itself is shorter than the communication time shared by all the STAs, the STA adds padding data and transmits the communication time shared by all the STAs.

On the other hand, in a case where the number of STAs connected to a single AP exceeds a maximum number of accesses allowed in UL-OFDMA for one time, the AP needs to assign RUs for UL-OFDMA over a plurality of times. In such a situation, when the AP assigns the RUs without considering the transmission buffer amount of each STA, the padding processing of the STA (processing for adding padding data) causes communication bandwidth to be wasted. For example, in a case where the AP assigns STAs having an extreme difference in the amounts of transmission buffers to the same UL-OFDMA frame, padding data of STAs having a small amount of data is large and frequency utilization efficiency is poor.

SUMMARY OF THE INVENTION

In view of the above problems, the present disclosure provides a technique for improving frequency utilization efficiency in wireless communication.

According to one aspect of the present invention, there is provided a communication apparatus which comprises: an obtainment unit configured to obtain, from each of a plurality of other communication apparatuses, an amount of buffered data of the each of the plurality of other communication apparatuses; a grouping unit configured to divide the plurality of other communication apparatuses into a plurality of groups based on the amount of buffered data of each of the plurality of other communication apparatuses; and an assignment unit configured to assign to each of the groups wireless frequency resources for which a shared data communication time is set.

Further features of the present invention will become apparent from the following description of exemplary embodiments (with reference to the attached drawings).

BRIEF DESCRIPTION OF THE DRAWINGS

FIG. 8 illustrates a configuration of a communication frame when RU assignment is performed in an AID order.

FIG. 9A is a flow chart illustrating the overall processing of the AP.

FIG. 13 illustrates a first example of transmission buffer amount, MCS, and communication time information of each STA managed by the AP.

FIG. 17 is a view for describing a flow of frames communicated in the fourth embodiment.

DESCRIPTION OF THE EMBODIMENTS

Hereinafter, the present invention is described in detail based on an example of an embodiment thereof with reference to the accompanying drawings. Note that the configuration shown in the following embodiments is merely an example, and the present invention is not limited to the illustrated configuration.

First Embodiment

Figure 1:
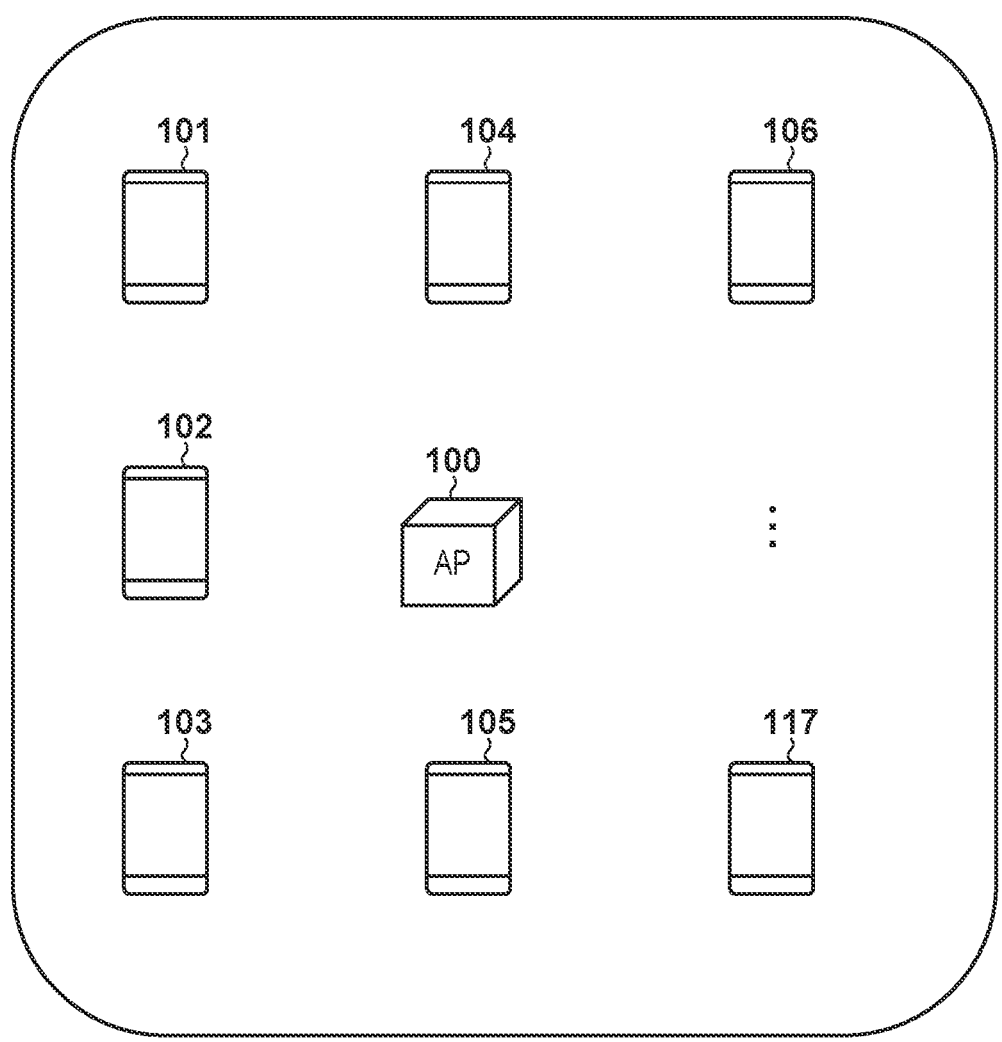
FIG. 1 illustrates an example of a network configuration.

FIG. 1 illustrates a configuration example of a network according to a first embodiment. FIG. 1 illustrates a configuration including 17 STAs 101 to 117 that support IEEE 802.11ax and one AP 100. Signals transmitted by the AP 100 can be received in the STAs 101 to 117. It is assumed that the STAs 101 to 117 and the AP 100 have been authenticated and can transmit and receive data to and from each other. However, this is merely one example, and the following discussion can be applied, for example, to a network including a large number of STAs in a wide area, or to various positional relationships of STAs.

In the example of FIG. 1, the STAs 101 to 117 perform MU communication (multi-user communication) with the AP 100 through OFDMA. Communication is performed by DL (downlink)-OFDMA from the AP 100 to the STAs 101 to 117 and by UL-OFDMA from the STAs 101 to 117 to the AP 100. In the present embodiment, each of the STAs 101 to 117 holds data to be transmitted, and the AP is notified of the amount of buffering, i.e., information of the amount of buffered data, which is information of the amount of data to be transmitted. The AP 100 assigns RUs for UL-OFDMA based on the information of the notified transmission buffer amounts.

(Configuration of AP)

Figure 2:
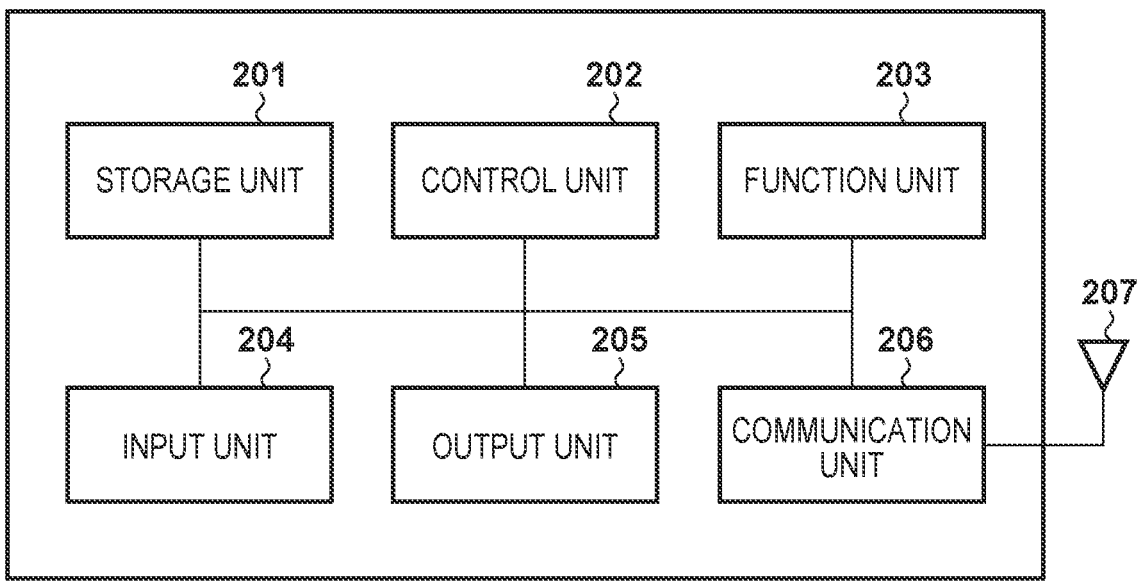
FIG. 2 illustrates an example of a hardware configuration of an AP.
Figure 3:
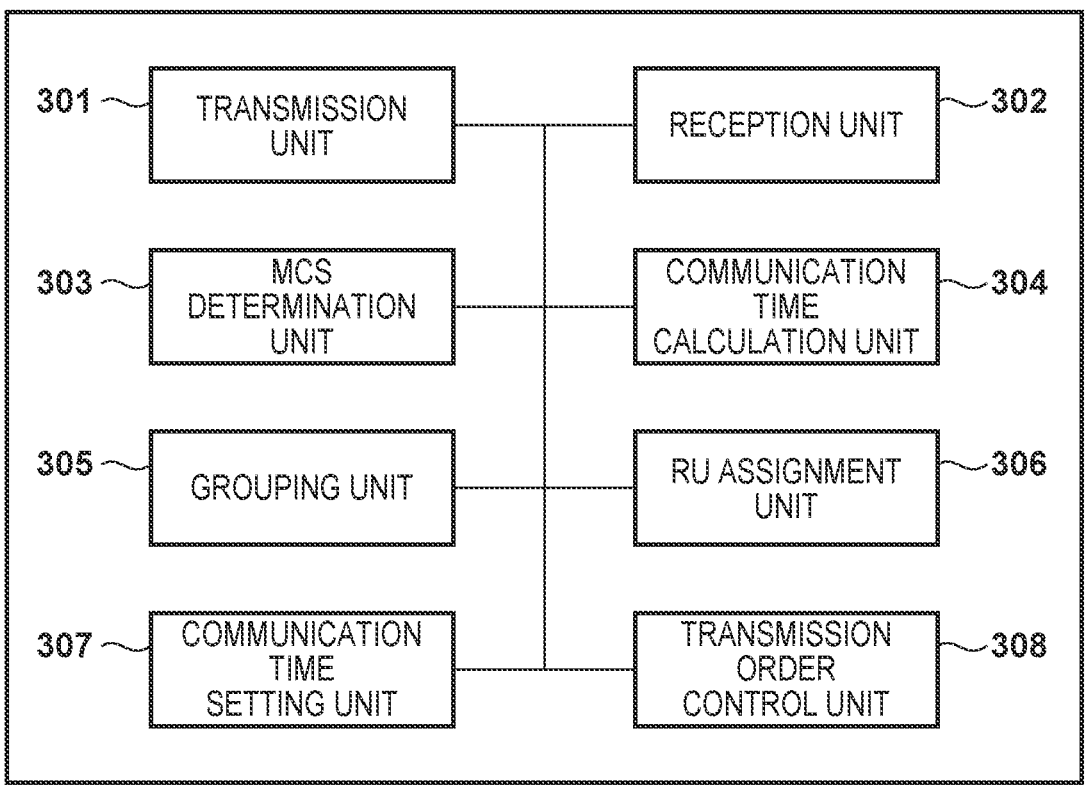
FIG. 3 illustrates an example of a functional block configuration of the AP.

Next, with reference to FIGS. 2 and 3, the configuration of the AP 100 is described. First, a hardware configuration of the AP 100 is described. FIG. 2 is a diagram illustrating an example of the hardware configuration of the AP 100. The AP 100 includes a storage unit 201, a control unit 202, a function unit 203, an input unit 204, an output unit 205, a communication unit 206, and an antenna 207 as an example of the hardware configuration.

The storage unit 201 is configured by a memory such as a ROM or a RAM, and stores various information such as a program for performing various operations to be described later, communication parameters for wireless communication, or the like. Note, as the storage unit 201, a storage medium such as a flexible disk, a hard disk, an optical disk, a magneto-optical disk, a CD-ROM, a CD-R, a magnetic tape, a nonvolatile memory card, a DVD, or the like may be used in addition to a memory such as a ROM or a RAM. The storage unit 201 may include a plurality of memories or the like.

The control unit 202 is configured by a processor such as one or more CPUs or MPUs, and controls the AP 100 by executing programs stored in the storage unit 201. Note, the control unit 202 may control the AP 100 by cooperating with programs stored in the storage unit 201 and an OS (Operating System). In addition, the control unit 202 may include a plurality of processors, such as the case of multi-core, to control the AP 100. The control unit 202 may control the function unit 203 to execute a predetermined process such as an AP function, imaging, printing, and projection. The function unit 203 is hardware for the AP 100 to execute a predetermined process.

The input unit 204 receives various operations from the user. The output unit 205 performs various outputs for the user. Here, the output by the output unit 205 includes at least one of a display on a screen, sound output by a speaker, vibration output, or the like. It should be noted that both the input unit 204 and the output unit 205 may be realized by one module such as a touch panel. The communication unit 206 performs control of radio communication based on IEEE 802.11ax or Wi-Fi, and control of IP (Internet Protocol) communication. Further, the communication unit 206 controls the antenna 207 to transmit and receive radio signals for radio communication.

Next, the functional configuration of the AP 100 is described. FIG. 3 is a diagram illustrating an example of a functional configuration of the AP 100. The AP 100 includes a transmission unit 301, a reception unit 302, an MCS determination unit 303, a communication time calculation unit 304, a grouping unit 305, an RU assignment unit 306, a communication time setting unit 307, and a transmission order control unit 308 as an example of the functional configuration.

The transmission unit 301 transmits a signal to another apparatus via the communication unit 206. The reception unit 302 receives a signal transmitted from another apparatus via the communication unit 206. The MCS determination unit 303 determines, as an MCS index, an MCS (Modulation and Coding Scheme) that can be applied for an STA. An example of an MCS index determined for each STA by the MCS determination unit 303 is described later with reference to FIGS. 7 and 13. The communication time calculation unit 304 calculates a data communication time of each STA based on information of a transmission buffer amount of each STA included in a BSR frame received by the reception unit 302 and based on the MCS determined by the MCS determination unit. Note, the communication time calculation unit 304 may derive (obtain) the data communication time of each STA by another method. The grouping unit 305 groups a plurality of STAs (data of STAs) into a plurality of groups. The RU assignment unit 306 assigns an RU to each STA. The communication time setting unit 307 sets the data communication time shared by all STAs belonging to each group grouped by the grouping unit 305. Also, the communication time setting unit 307 may update the data communication time according to the assignment of RUs by the RU assignment unit 306. The transmission order control unit 308 controls the order of signals transmitted by the transmission unit 301.

(Frame Structure)

Figure 4:
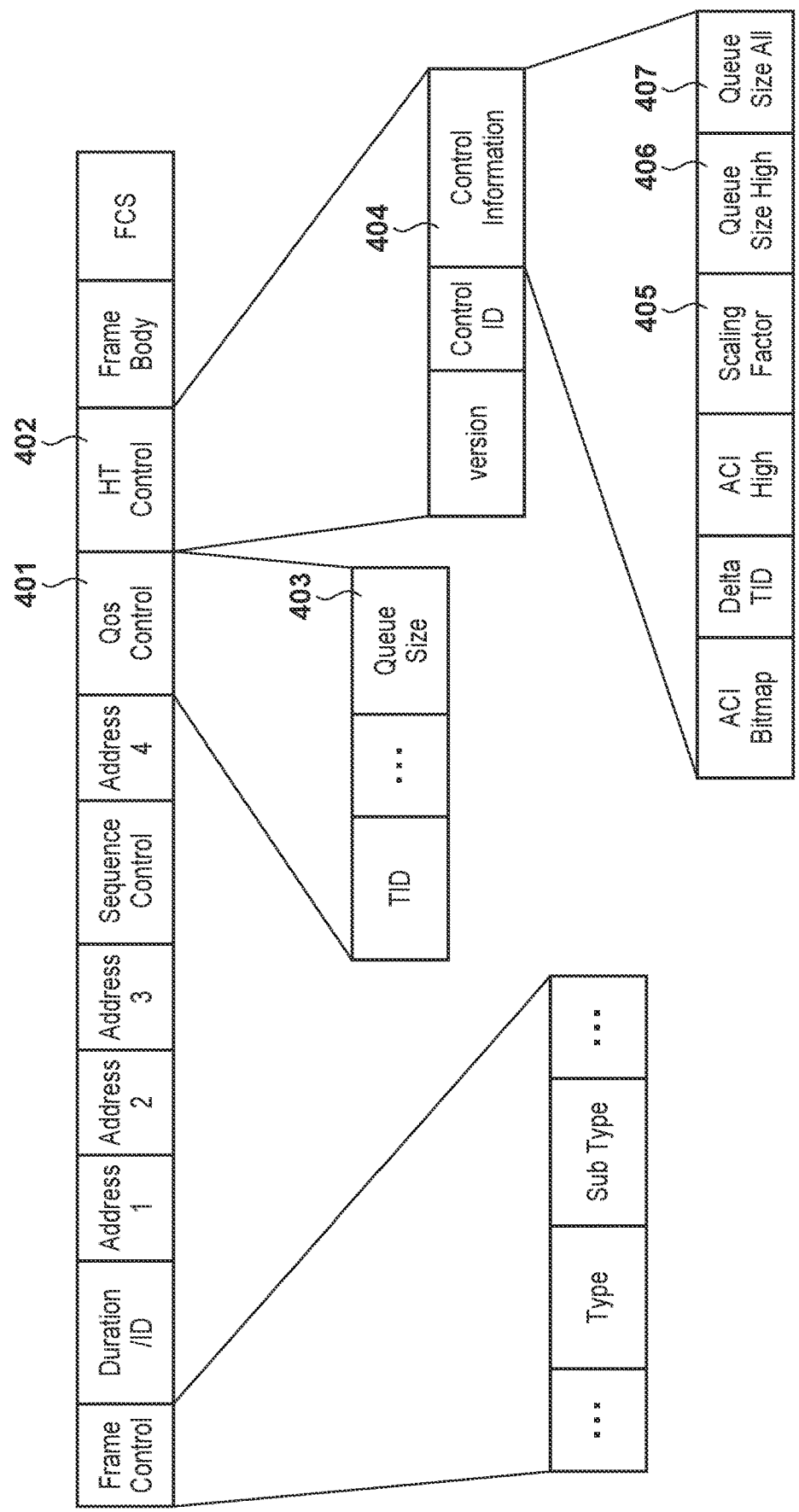
FIG. 4 illustrates an example of a configuration of a BSR frame.
Figure 5:
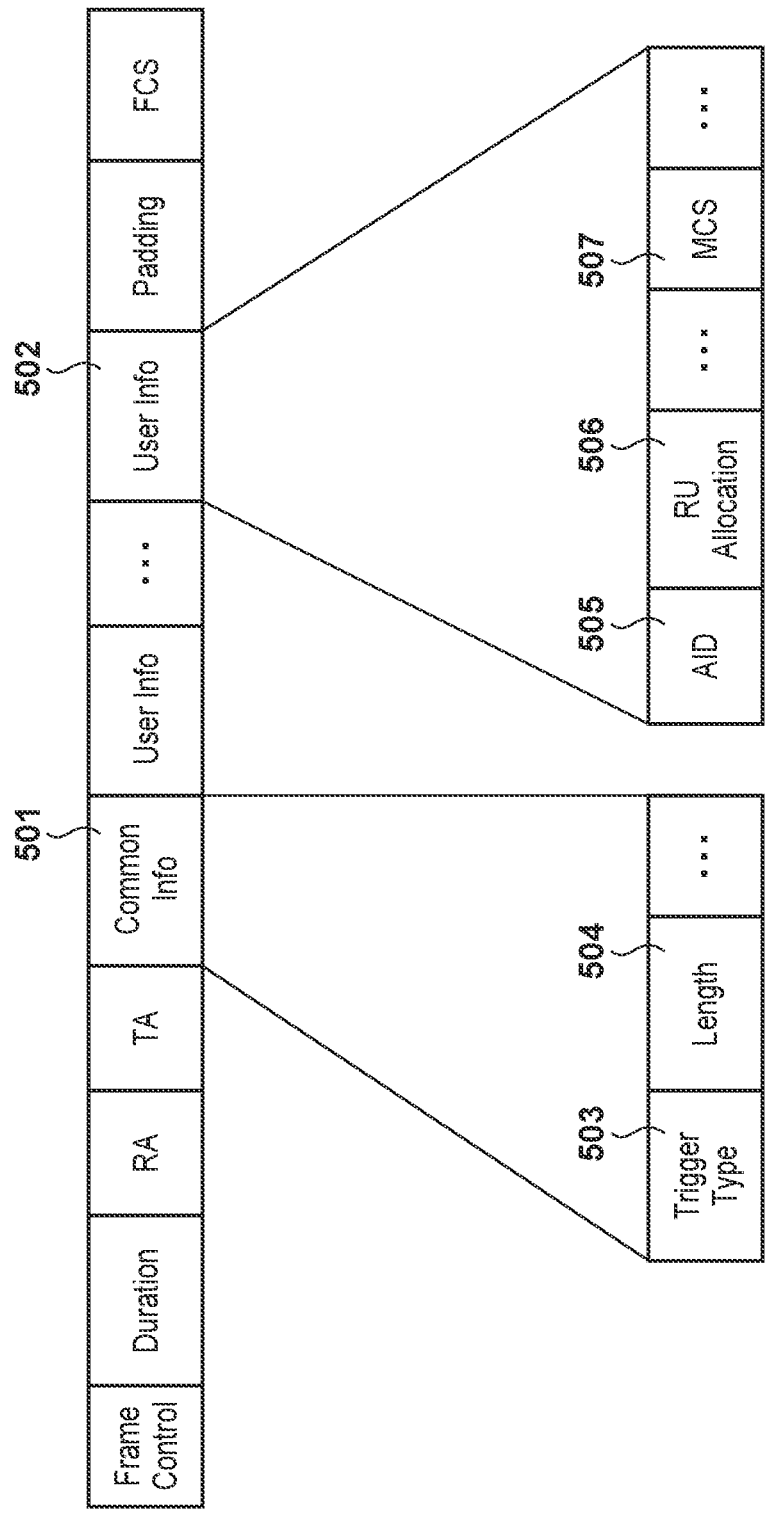
FIG. 5 illustrates an example of a Trigger frame.

Next, with reference to FIG. 4 and FIG. 5, the configuration of a frame to be communicated in the present embodiment is described, and FIG. 4 illustrates an example of a configuration of a Buffer status report (BSR) frame used by the STAs 101 to 117 to notify the AP 100 of its own transmission buffer amount. The transmission buffer amount may be indicated by a Queue size sub-field 403 contained in a QoS Control field 401 or by a Scaling Factor sub-field 405, a Queue Size High sub-field 406, and a Queue Size All sub-field 407 in a Control Information sub-field 404 of a HT Control field 402.

Upon receiving a BSR frame having the configuration as illustrated in FIG. 4 from each of the STAs 101 to 117, the AP 100 determines the assignment of RUs for UL-OFDMA and the communication time shared by all the STAs based on the information of the transmission buffer amount included in the BSR frame. Thereafter, the AP 100 transmits a Trigger frame including information relating to the RU and the data communication time shared by all the STAs (hereinafter, referred to as RU/communication time information).

FIG. 5 illustrates a configuration example of a Trigger frame. A Common Info field 501 includes information shared by all STAs. In a Length sub-field 504 in the Common Info field 501, a data communication time shared by all STAs are set. In a case where a Trigger Type sub-field 503 of the Common Info field 501 is 0, a User Info field 502 is added. The User Info field 502 includes, for each of the STAs, an AID (Association ID) sub-field 505 for specifying the STA, and an RU Allocation sub-field 506 for specifying an RU (a unit of a grouped plurality of subcarriers) to be assigned and a number of tones (number of subcarriers). An MCS is specified in an MCS sub-field 507.

Figures 6, 7:
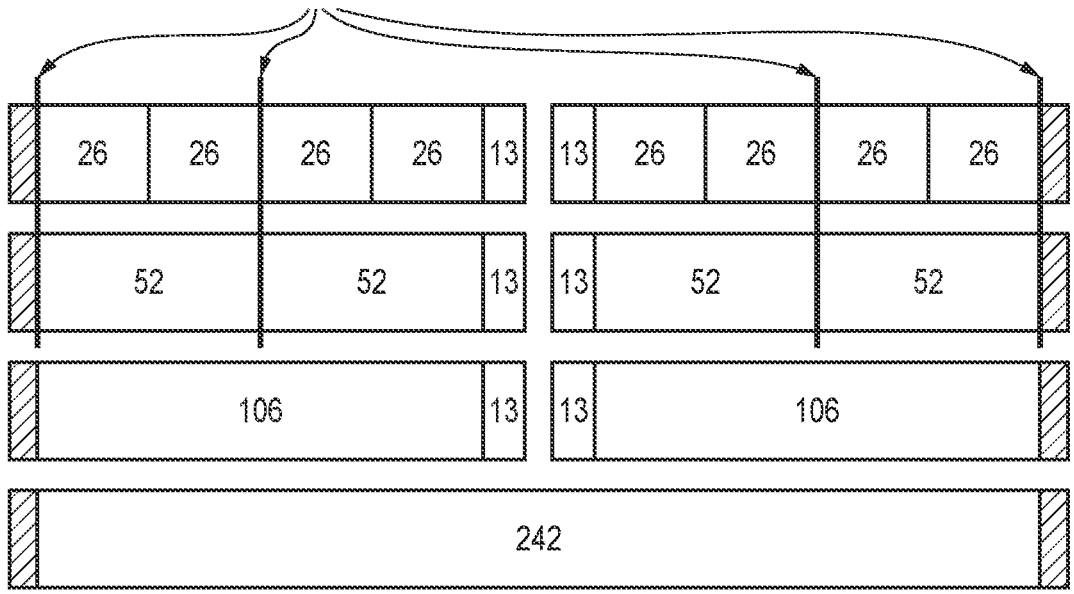
FIG. 6 illustrates a relationship between a number of tones and an RU in 20 MHz.
FIG. 7 illustrates a first example of transmission buffer amount, MCS, and communication time information of each STA managed by the AP.

FIG. 6 illustrates an example of a relationship between a number of tones (number of subcarriers) and RUs (a unit of a grouped plurality of subcarriers) in 20 MHZ. Null subcarriers are inserted to mitigate interference. As understood from FIG. 6, an assignment of 9 RUs is possible in a case where the number of tones is 26. Note that an RU can also be assigned in 40 MHz and 80 MHz in the same manner as in 20 MHz.

(General RU Assignment Procedure)

Next, a general RU allocation procedure is described with reference to FIGS. 7 and 8. FIG. 7 is a view illustrating a first example of information, managed by the AP 100, of a transmission buffer amount, MCS, and communication time of each of the STAs 101 to 117. An AID 701 corresponds to the values in the AID sub-field 505 of FIG. 5, and is an Association ID (Identification) for identifying STAs that are in a state to be communicable with the AP 100. In this embodiment, as illustrated in FIG. 1, the AP 100 can communicate with the STAs 101 to 117, and AIDs 1 to 17 correspond to the STAs 101 to 117, respectively. A Queue size 702 indicates the amount of transmission buffers included in the BSR frame received by the AP 100 from each of the STAs 101 to 117. An MCS index 703 indicates identifiers of a Modulation and Coding Scheme to be applied based on the communication quality of each of the STAs 101 to 117. For example, the MCS determination unit 303 of the AP 100 may measure the communication quality of each of the STAs 101 to 117 based on the BSR frame received by the reception unit 302, and may determine the MCS indexes based on the value measured. The communication quality is, for example, an SINR (a signal-to-noise-and-interference ratio).

In IEEE 802.11ax, in a case where the MCS index is 0, a BPSK coding rate is indicated by ½, in a case where the MCS index is 1, a QPSK coding rate is indicated by ½, and in a case where the MCS index is 3, a 16 QAM coding rate is indicated by ½. That is, the lower the MCS index, the stronger (higher) the error tolerance. Once the Queue size and MCS indexes are determined, the communication time calculation unit 304 of the AP 100 can calculate a communication time 704, which is the data communication time. For example, a case in which, when data of Queue size=1 is transmitted by using the Modulation and Coding Scheme corresponding to MCS index=0, the time required is 8 ms is as follows. That is, when data of the same Queue size (=1) is transmitted using the Modulation and Coding Scheme corresponding to MCS index=1, the time required is 4 ms which is half of 8 ms. Also, when data of the same Queue size (=1) is transmitted using the Modulation and Coding Scheme corresponding to MCS index=3, the time required is 2 ms which is ¼ of 8 ms. In addition, in a case where data of a Queue size having twice the length is transmitted by using the modulation and coding scheme corresponding to the same MCS index, twice the time is required.

FIG. 8 illustrates a flow of frames communicated when the AP 100 assigns RUs for UL-OFDMA to STAs in ascending order of AIDs based on the information illustrated in FIG. 7. In the example of FIG. 8, first, the AP 100 determines an RU to be assigned to each of the STAs 101 to 109 (corresponding to AIDs 1 to 9) based on information included in a BSR frame (not shown) received from each of the STAs 101 to 117 (corresponding to AIDs 1 to 17). Thereafter, the AP 100 includes RU assignment information for each of the STAs 101 to 109 in a Trigger frame 801. The longest data communication time among the STAs 101 to 109 is 16 ms for the STA 102, the STA 106, the STA 108 (AID2, AID6, and AID8). Therefore, the AP 100 sets 16 ms as the data communication time shared by all the STAs to the Length sub-field 504 of the Trigger frame 801 (FIG. 5). Each of the STAs 101 to 109 assign data based on the RU/communication time information included in the Trigger frame 801 received from the AP 100, and transmit a UL-OFDM frame 802. Here, in a case where the data transmission time of each of the STAs 101 to 109 is shorter than the time specified in the Length sub-field 504 of the Trigger frame 801 (the data communication time shared by all the STAs), each of the STAs 101 to 109 add padding data (Pad). As a result, each of the STAs 101 to 109 transmit data for the time specified by the Length sub-field 504. After receiving the UL-OFDM frame 802, the AP 100 transmits a multi-user Block ACK 803 to each of the STAs 101 to 109 as a reply.

Next, based on the information included in the BSR frame (not shown) received from each of the STAs 101 to 117 (corresponding to the AIDs 1 to 17), RUs assigned to each of the STAs 110 to 117 (corresponding to the AIDs 10 to 17) are determined. Thereafter, the AP 100 includes RU assignment information for each of the STAs 110 to 117 in a Trigger frame 804. The longest data communication time among the STAs 110 to 117 is 16 ms for the STA 110, the STA 112, the STA 115 (AID10, AID12, and AID15). For this reason, the AP 100 sets 16 ms as the data communication time shared by all the STAs to the Length sub-field 504 of the Trigger frame 804. Similar to the UL-OFDM frame 802, each of the STAs 110 to 117 assigns their own data based on the RU/communication time information included in the Trigger frame 804 received from the AP 100, adds padding data as required, and transmits a UL-OFDM frame 805. Thus, in the example of FIG. 8, it can be understood that the STAs 101 to 117 require a total of 32 ms (16 ms+16 ms) for transmitting data by UL-OFDMA.

(Processing Flow)

Figure 9B:
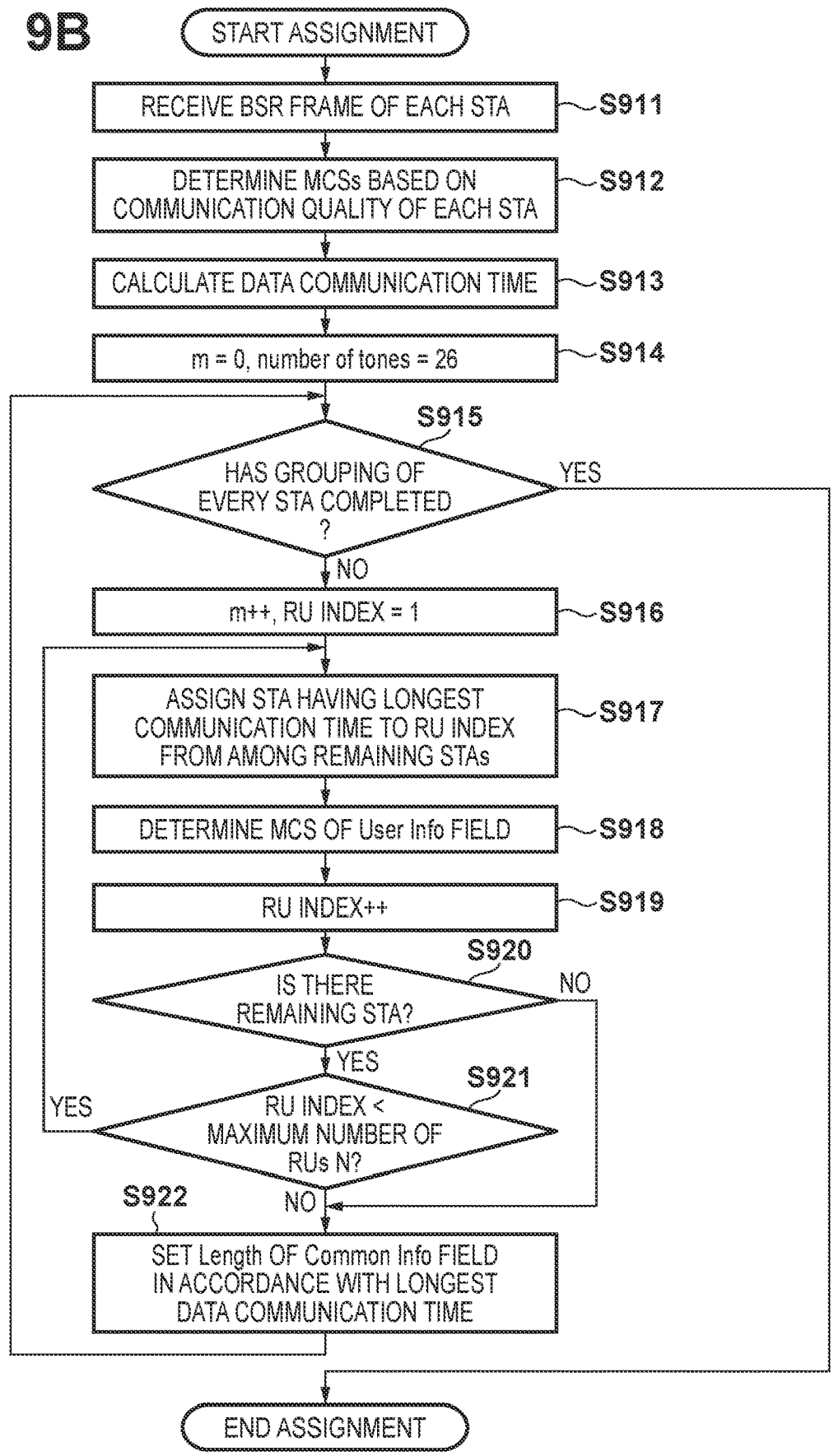
FIG. 9B is a flow chart illustrating RU assignment processing for UL-OFDMA according to a first embodiment.

Next, the process of the AP 100 in the present embodiment is described with reference to FIG. 9A and FIG. 9B. FIG. 9A is a flowchart illustrating the overall processing of the AP 100 in the present embodiment, and FIG. 9B is a flowchart illustrating the RU assignment processing for UL-OFDMA in the present embodiment. The flowcharts illustrated in FIG. 9A and FIG. 9B can be realized by the control unit 202 of the AP 100 executing the control programs stored in the storage unit 201 and by executing calculation and processing of information and control of each piece of hardware, respectively.

In the following description, it is assumed that the number of STAs for which data transmission is desired exceeds a maximum number of accesses permitted in UL-OFDMA in a single time. In FIG. 9A, firstly, in step S901, the AP 100 performs the RU assignment processing for UL-OFDMA. Specifically, the AP 100 divides the STAs (data of STAs) into a plurality of groups, assigns an RU to each STA in every group for a multiple access connection to the AP 100, and sets data communication times. The process of step S901 is described later with reference to FIG. 9B. Also, it is assumed that the STAs are grouped into M groups (total number of groups M). Also, in the following explanation, it is assumed that the grouping unit 305 groups multiple STAs according to the data communication time of each STA, but the STAs may be grouped using the data amount itself to be transmitted for each STA (information of the data amount).

In step S902, the transmission order control unit 308 sets a group index m to 0. Next, in step S903, the transmission order control unit 308 determines whether or not the group index m has reached the total number of groups M grouped in step S901. If the group index m has not reached the total number of groups M (YES in step S903), the process proceeds to step S904, and if the group index m has reached the total number of groups M (NO in step S903), the process ends. In step S904, the transmission order control unit 308 transmits a Trigger frame including the RU/communication time information to the plurality of STAs included in the group of the group index m. Each of the STAs that receive the Trigger frame then assign their own data based on the RU/communication time information included in the frame, and transmit the UL-OFDM frame. Accordingly, the reception unit 302 receives the UL-OFDM frames in step S905. Next, in step S906, based on the reception result of the UL-OFDM frame in step S905, the transmission unit 301 stores a reception state in the multi-user Block ACK and transmits the reception state to the same plurality of STAs which were the transmission destination of the Trigger frame in step S904. Next, in step S907, the transmission order control unit 308 increments the group index m, and the process returns to step S903. If the group index m does not reach the total number of groups M, the processing of steps S904 to S907 is repeated. Note, configuration may be taken such that the AP 100 periodically executes the overall processing of steps S901 to S907, or configuration may be taken such that the processing is executed in a case where the number of STAs for which the transmission of data is desired reaches a predetermined number.

Next, the RU assignment processing for UL-OFDMA of step S901 will be described in detail with reference to FIG. 9B. In step S911, the reception unit 302 receives a BSR frame from each of a plurality of STAs that wish to transmit data. Next, in step S912, the MCS determination unit 303 determines applicable MCSs based on the communication quality of each of the STAs. Subsequently, in step S913, the communication time calculation unit 304 calculates the data communication time of each STA from the MCSs of each determined STA and the information of the transmission buffer amount included in the received BSR frame (information on the amount of data to be transmitted). In step S914, the grouping unit 305 sets the group index m to 0, and the RU assignment unit 306 sets the number of tones constituting the RUs to 26, which is the smallest number. Next, in step S915, the grouping unit 305 determines whether grouping of every STA (data of every STA) has been completed. In a case where the grouping is not completed (NO in step S915), the process proceeds to step S916, and in a case where the grouping is completed (YES in step S915), the process ends.

In step S916, the grouping unit 305 increments the UL-OFDMA group index m, and the RU assignment unit 306 sets the RU index to 1. Next, in step S917, the RU assignment unit 306 selects an STA having the longest data communication time from among the STAs to which an RU has not yet been assigned, and assigns the selected STA to an RU index. Next, in step S918, the MCS determination unit 303 determines the MCS of the selected STA (similar to the step S912) and sets the MCS to the MCS sub-field 507 of the User Info field 502 of the Trigger frame. In step S919, the RU assignment unit 306 increments the RU index. Next, in step S920, the RU assignment unit 306 determines whether there are any STAs to which an RU has not been assigned. In a case where there is an STA to which an RU has not been assigned (YES in step S920), the process proceeds to step S921, and in a case where there is no STA to which an RU has not been assigned (NO in step S920), the process proceeds to step S922.

In step S921, the grouping unit 305 determines whether the RU index is less than N, which is the maximum number of RUs (maximum RU number) assignable to one group. That is, the grouping unit 305 determines whether the number of STAs (data of STAs) belonging to one group is less than N. In this example, if the tone number is 26, the maximum number of assignable RUs is 9. Accordingly, the grouping unit 305 determines whether the RU index is less than 9. In a case where the RU index is not less than the maximum number of RUs (the maximum number of RUs has been reached) (NO in step S921), the process proceeds to step S922. In a case where the RU index is less than the maximum number of RUs (the maximum number of RUs has not been reached) (YES in step S921), the process returns to step S917, and the RU assignment unit 306 performs RU assignment for an STA to which no RU has been assigned. In step S922, since the assignment of the RUs in UL-OFDMA for one time has completed, the communication time setting unit 307 sets the data communication time of the STA having the longest data communication time within the groups to the Length sub-field 504 of the Common Info field 501 of the Trigger frame. After step S922, the process returns to step S915. In a case of YES in step S915, the group index m is the total number of groups M.

Figure 10:
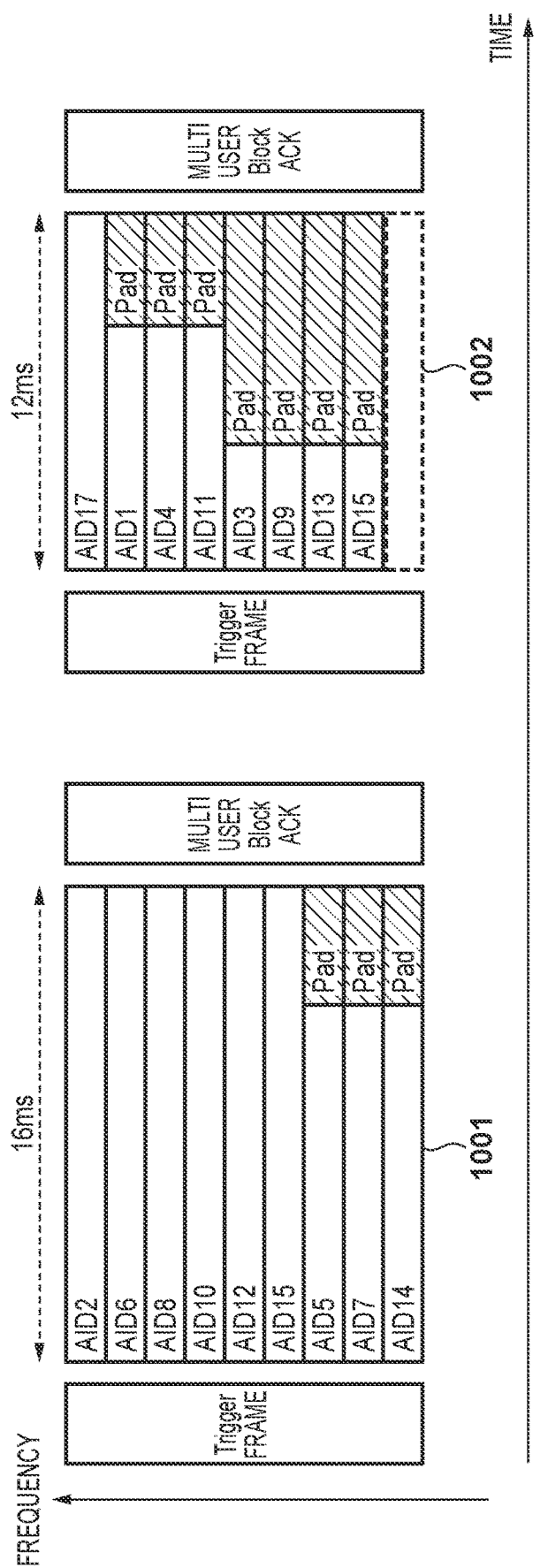
FIG. 10 is a view for describing a flow of frames communicated in the first embodiment.

FIG. 10 illustrates a flow of frames communicated when the AP 100 assigns RUs in UL-OFDMA based on the processing illustrated in FIG. 9A and FIG. 9B. It should be noted that points different from FIG. 8 will be described. The AP 100 assigns RUs in order from STAs with the longest data communication times, groups a plurality of STAs (data of STAs) with longer data communication times into one group, and transmits a UL-OFDM frame 1001. Then, a plurality of STAs (data of STAs) with shorter communication times are grouped into one group, and a UL-OFDM frame 1002 is transmitted. In the UL-OFDM frame 1002, the longest data communication time is a 12 ms data communication time for the STA 107 (AID17). In the case of FIG. 10, since the UL-OFDMA data transmission requires a total of 28 ms (16 ms+12 ms), the frequency utilization efficiency is improved compared with the case of FIG. 8. Further, an effect of suppressing power consumption in the STAs can also be achieved by reducing the transmission time of the padding data of the STA.

Second Embodiment

Figure 11:
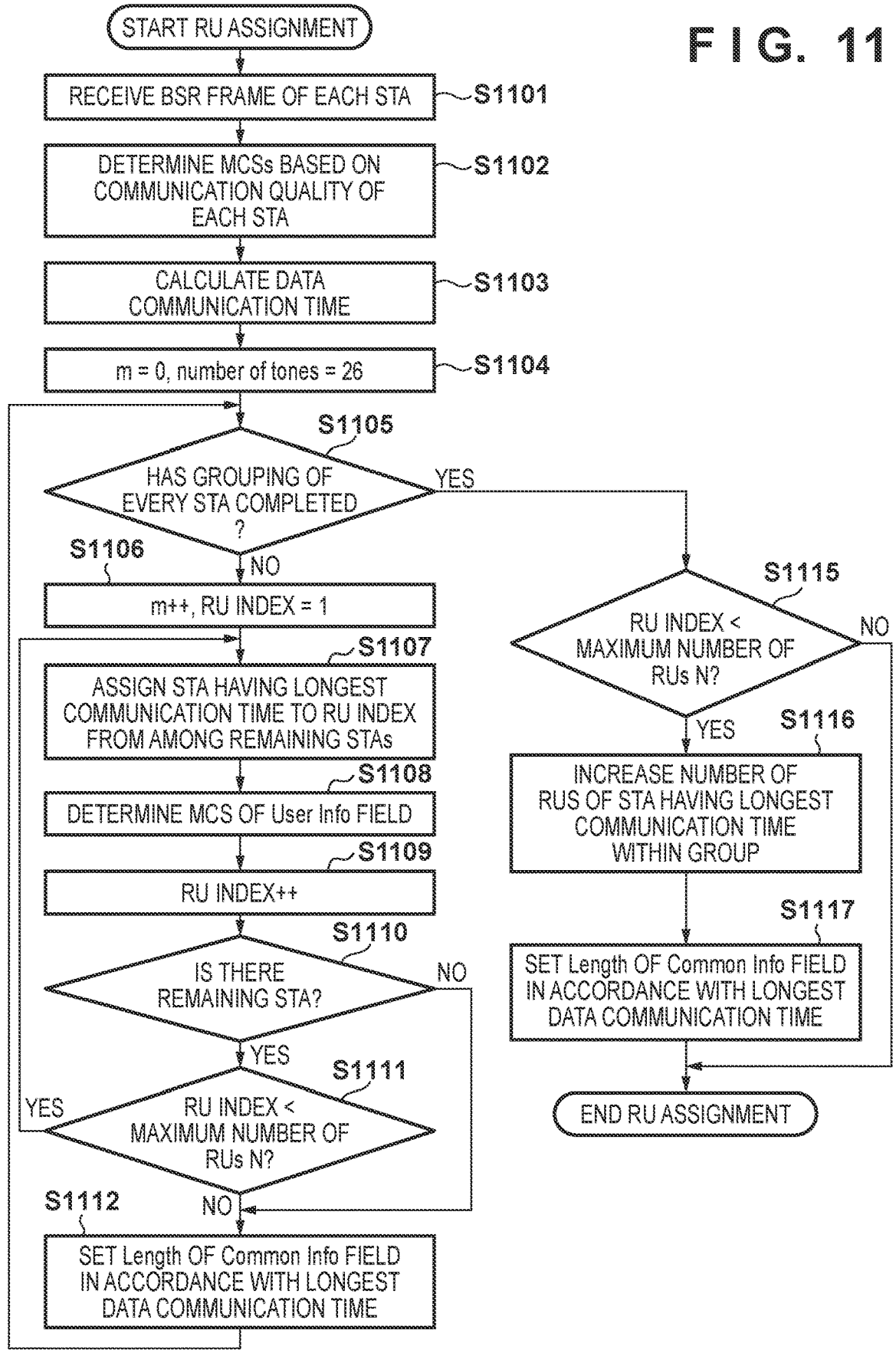
FIG. 11 is a flow chart illustrating RU assignment processing for UL-OFDMA according to the first embodiment.

Points in which the RU assignment processing for UL-OFDMA in the second embodiment differ from the RU assignment processing in the first embodiment will be described. FIG. 11 is a flow chart illustrating RU assignment processing for UL-OFDMA in the present embodiment. Since the processing of steps S1101 to S1112 is the same as the processing of steps S911 to step S922 of the FIG. 9B described in the first embodiment, the description thereof is omitted.

In step S1105, in a case where grouping of all STAs (data of all STAs) is completed (YES in step S1105), the process proceeds to step S1115. Based on the information of FIG. 7, the configurations of the UL-OFDM frames assumed at this point in time are the UL-OFDM frames 1001 and 1002 illustrated in FIG. 10. In step S1115, the grouping unit 305 determines whether the RU index is less than a maximum number of RUs N. In a case where the RU index is less than the maximum number of RUs (YES in step S1115), the process proceeds to step S1116, and in a case where the RU index is not less than the maximum number of RUs (NO in step S1115), the process ends. In step S1116, the RU assignment unit 306 increases the number of RUs to be assigned to at least one STA within the UL-OFDMA group (the STA having the longest data communication time in this embodiment). That is, the number of tones is increased. For example, in the UL-OFDM frame 1002 of FIG. 10, the RU assignment unit 306 increases the number of RUs assigned (number of tones) for the STA 117 (AID17) whose communication time is the longest. In response to this, the communication time setting unit 307 updates the data communication time of the STAs for which the number of RUs has been increased. Here, the data communication time may be updated to a time by dividing the original data communication time by the increased number of RUs. Next, in step S1117, the communication time setting unit 307 updates the Length sub-field 504 of the Common Info field 501 of the Trigger frame in accordance with the updated data communication time. That is, the communication time setting unit 307 updates the Length sub-field 504 to the data communication time of the STAs having the longest data communication time in the group.

Figure 12:
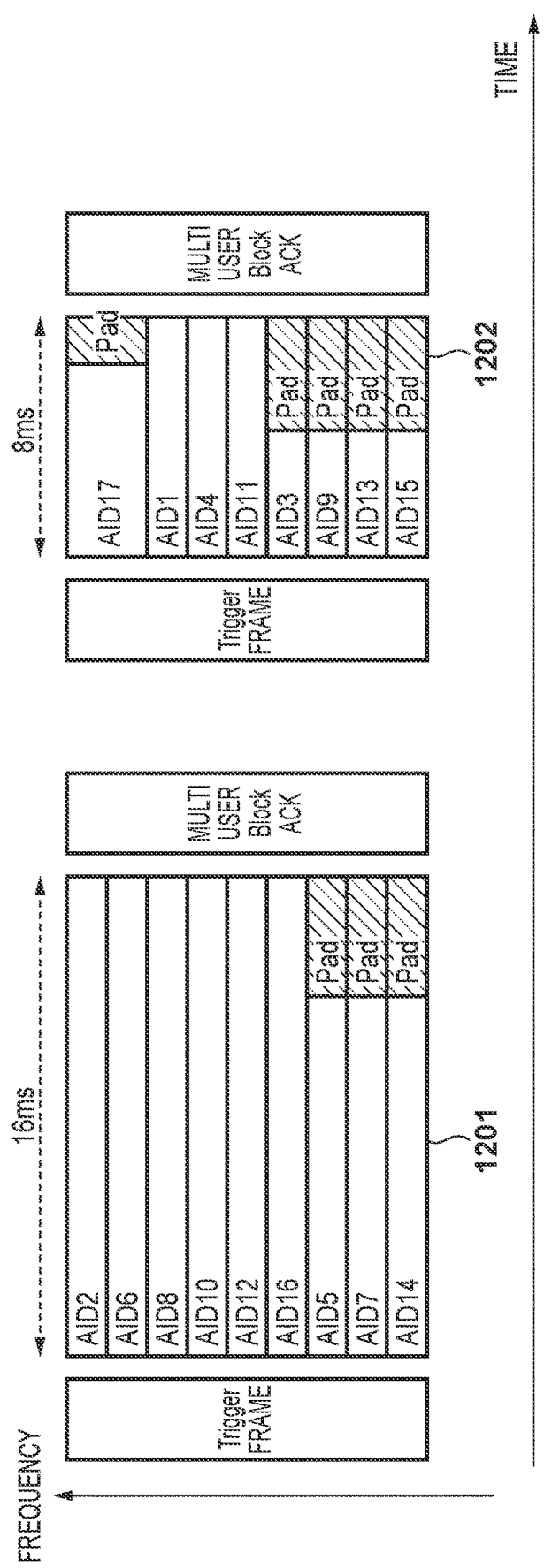
FIG. 12 is a view for describing a flow of frames communicated in a second embodiment.

FIG. 12 illustrates a flow of frames communicated when the AP 100 assigns an RU for UL-OFDMA based on the processing illustrated in FIG. 11. It should be noted that points different from FIG. 10 will be described. Compared to FIG. 10, a first UL-OFDM frame 1201 is similar to the UL-OFDM frame 1001, but the second UL-OFDM frame 1202 differs from the UL-OFDM frame 1002. That is, in the second group, the STA having the longest communication time is changed from STA 117 (AID17) to the STAs 101, 104, and 111 (AID1, AID4, and AID11), and the data communication time (Length sub-field) is updated to 8 ms. As a result, the UL-OFDMA data transmission requires a total of 24 ms (16 ms+8 ms), and the frequency utilization efficiency is further improved compared with the case of FIG. 10.

Third Embodiment

Points in which the RU assignment processing for UL-OFDMA in the third embodiment differs from the RU assignment processing in the first and second embodiment will be described. FIG. 13 illustrates a second example of information of a transmission buffer amount, MCS, and communication time of each of the STAs 101 to 117 managed by the AP 100. In FIG. 13, compared with FIG. 7, the Queue size of an STA (STA 102) corresponding to AID2 is larger (=10), and a communication time of 20 ms is required (underlined portions).

Figure 14:
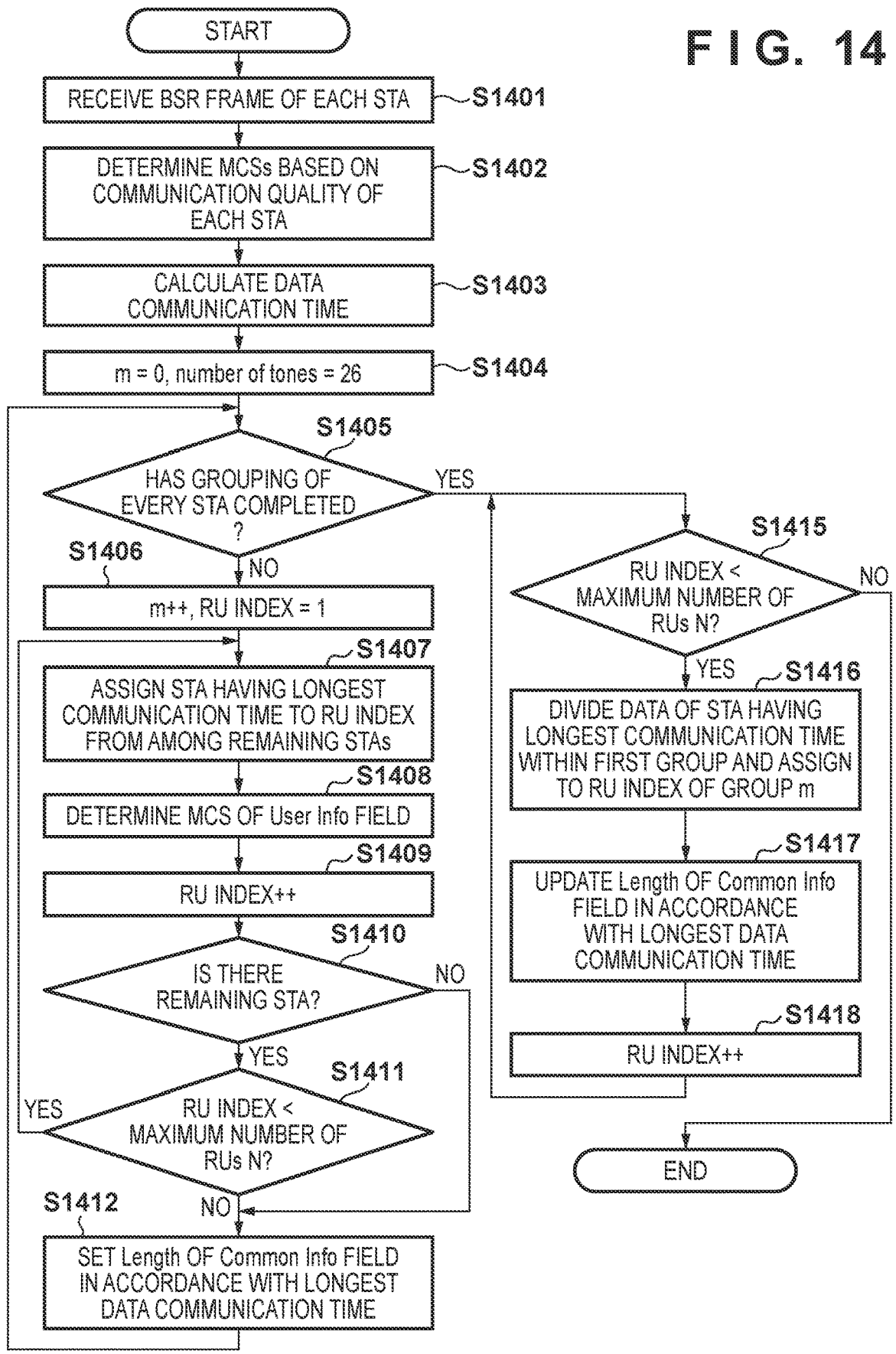
FIG. 14 is a flow chart illustrating RU assignment processing for UL-OFDMA according to a third embodiment.
Figure 15:
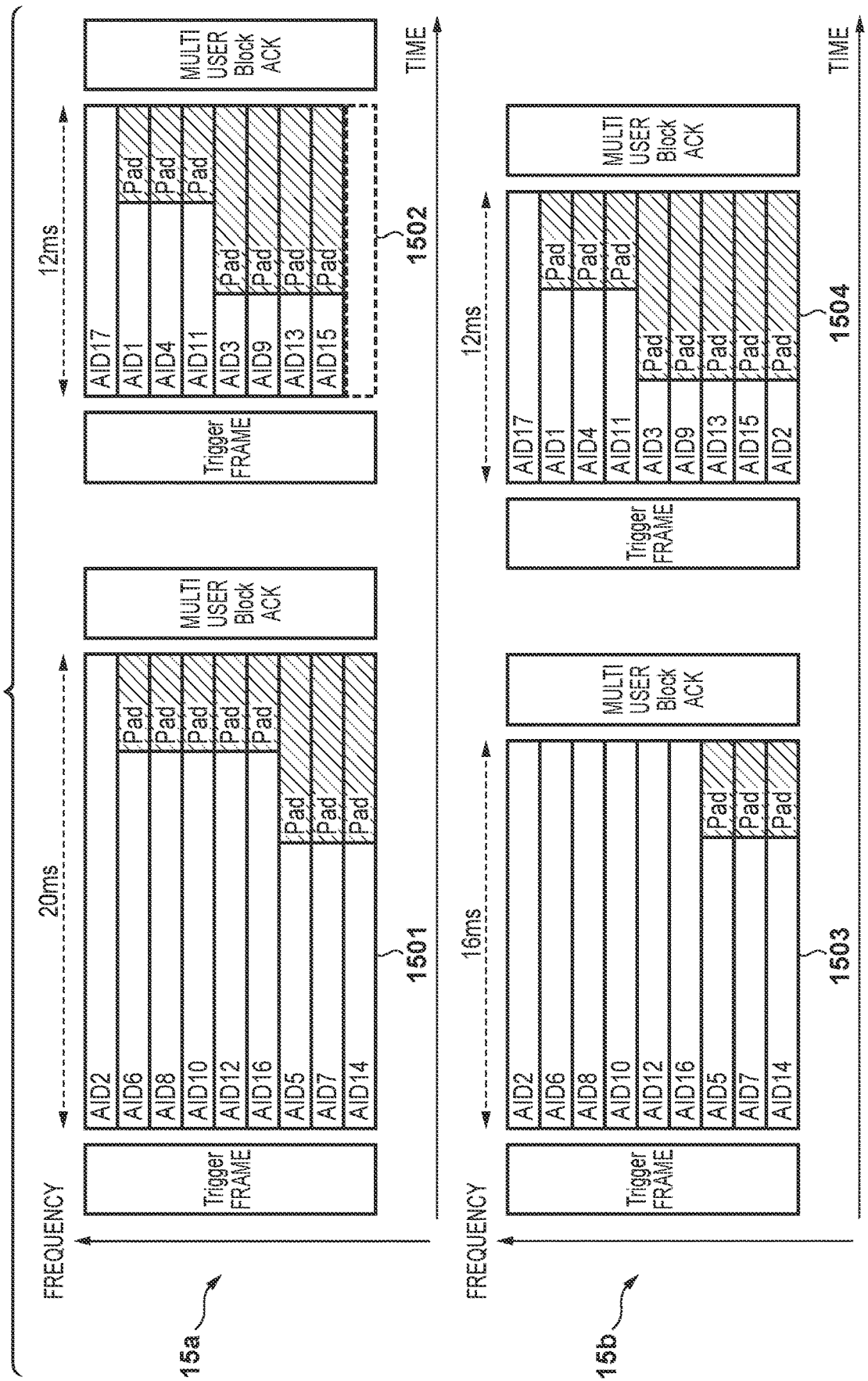
FIG. 15 is a view for describing a flow of frames communicated in the third embodiment.

FIG. 14 is a flow chart illustrating RU assignment processing for UL-OFDMA in the present embodiment. FIG. 15 illustrates a flow of communication frames for describing the present embodiment. Regarding FIG. 15, points different from FIG. 10 will be described.

In FIG. 14, since the processing of steps S1401 to S1412 is the same as the processing of steps S911 to step S922 of FIG. 9B described in the first embodiment, the description thereof is omitted. In step S1405, in a case where the grouping of all STAs (data of all STAs) is completed (YES in step S1405), the process proceeds to step S1415. Based on the information of FIG. 13, the configuration of the UL-OFDM frames assumed at this point in time is as in the UL-OFDM frames 1501 and 1502 illustrated in configuration 15a. In step S1415, the grouping unit 305 determines whether the RU index is less than a maximum number of RUs N. In a case where the RU index is less than the maximum number of RUs (YES in step S1415), the process proceeds to step S1416, and in a case where the RU index is not less than the maximum number of RUs (NO in step S1415), the process ends.

In step S1416, the grouping unit 305 divides the data of the STAs having the longest data communication time within the first group, and assigns the divided data to the first group and the m-th group. Then, the RU assignment unit 306 assigns the divided data assigned to the m-th group to the current RU index. That is, the grouping unit 305 divides the data of the STA having the longest data communication time in the first group, and groups the divided plurality of data so as to belong to a plurality of groups. Note that here, an example has been described in which the data of the STA having the longest data communication time in the first group is divided, but a target of the data to be divided may be data having a data communication time longer than a predetermined value among the data of all the STAs. Further, at the time of dividing, it can be determined arbitrarily at which position to divide the data.

For example, in a case where the configuration of the assumed UL-OFDM frames at the time of step S1415 is as in the UL-OFDM frames 1501 and 1502 shown in the configuration 15a, the grouping unit 305 divides the data of the STA (STA 102) corresponding to the AID2 of the first UL-OFDMA group, assigns the divided data to the second UL-OFDMA group, and the RU assignment unit 306 assigns the data to the free RU. Next, in step S1417, the communication time setting unit 307 updates the Length sub-field 504 of the Common Info field 501 of the Trigger frame in accordance with the updated data communication time. Then, in step S1418, the RU assignment unit 306 increments the RU index. In a UL-OFDM frame 1504 in a configuration 15b, the Length sub-field 504 is updated to 16 ms since the longest communication time in the first UL-OFDMA group is changed to 16 ms. As a result, since UL-OFDM frames 1503 and 1504 of FIG. 15 require a total of 28 ms (16 ms+12 ms) to transmit UL-OFDMA data, the frequency utilization efficiency is improved as compared with the frequency utilization efficiency prior to data division.

Fourth Embodiment

Points in which the RU assignment processing for UL-OFDMA in the fourth embodiment differs from the RU assignment processing in the first through third embodiments will be described. The present embodiment relates to increasing error tolerance of transmission data of an STA.

Figure 16:
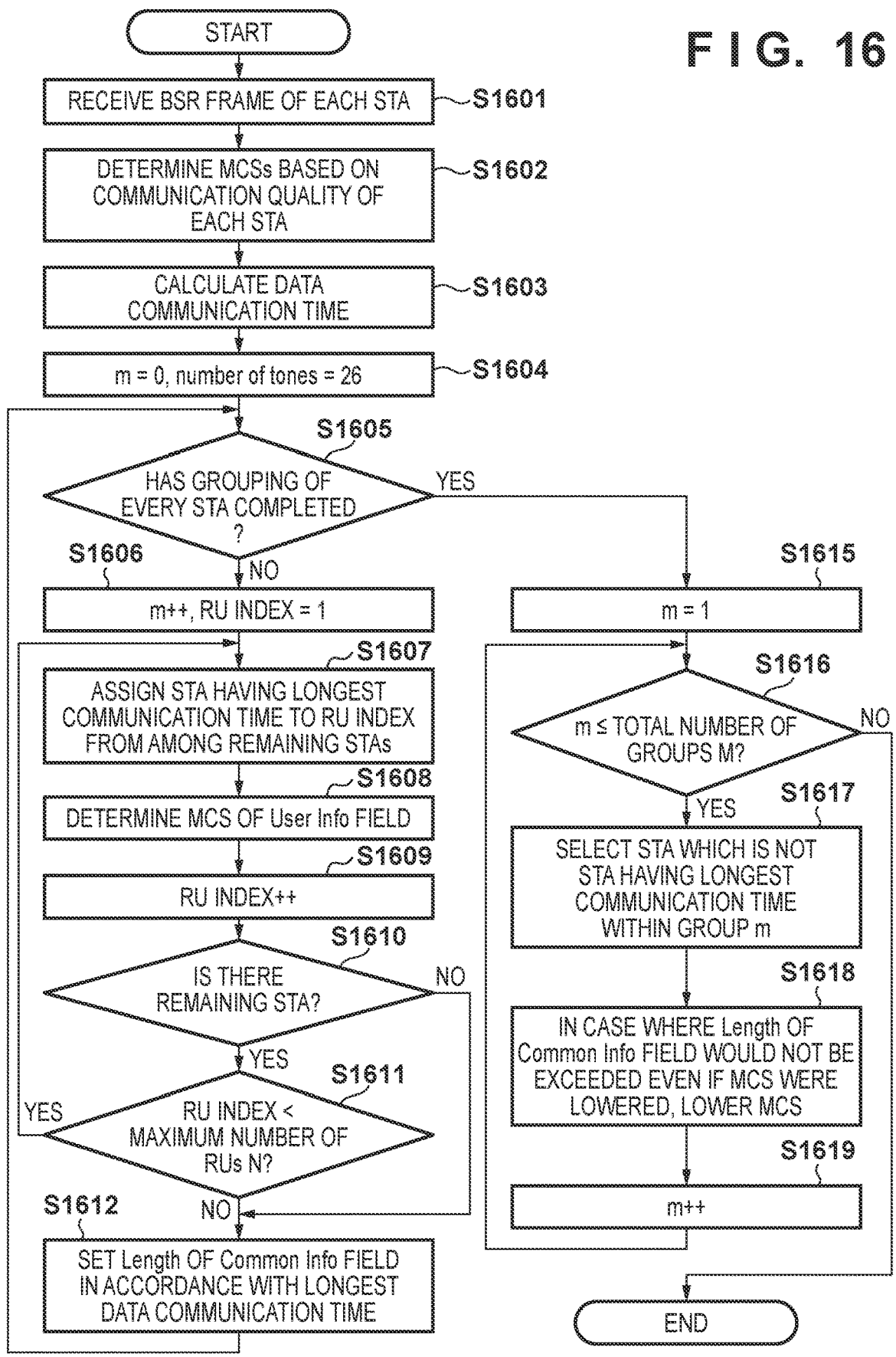
FIG. 16 is a flow chart illustrating RU assignment processing for UL-OFDMA according to the fourth embodiment.

FIG. 16 is a flow chart illustrating RU assignment processing for UL-OFDMA in the present embodiment. Since the processing of steps S1601 to S1612 is the same as the processing of steps S911 to step S922 of the FIG. 9B described in embodiment 1, the description thereof is omitted. In step S1605, when grouping of all STAs (data of all STAs) is completed (YES in step S1605), the process proceeds to step S1615. Based on the information of FIG. 7, the configuration of the UL-OFDM frames assumed at this point in time is as in the UL-OFDM frames 1001 and 1002 illustrated in FIG. 10. In step S1615, the grouping unit 305 sets a group index m to 1. Next, in step S1616, the grouping unit 305 determines whether the group index m is less than or equal to the total number of groups M. In a case where the group index m is less than or equal to the total number of groups M (YES in step S1616), the process proceeds to step S1617, and in a case where the group index m not less than or equal to the total number of groups M (NO in step S1616), the process ends.

In step S1617, the MCS determination unit 303 selects STAs other than an STA having the longest communication time within the group of the group index m. For example, with reference to FIG. 10, STAs corresponding to AID5, AID7, and AID14 are selected from the first group. Next, in step S1618, the MCS determination unit 303 lowers the MCS indexes that were previously determined for these selected STAs within an extent that the value indicated in the Length sub-field 504 of the Common Info field 501 within the group is not exceeded when the MCS indexes are lowered to those of stronger error tolerance. According to FIG. 7, the MCS indexes corresponding to AID5, AID7, and AID14 are 1, and the MCS determination unit 303 does not change the MCS indexes since the communication times do not fall within 16 ms or less when the MCS index is lowered to 0. Next, in step S1619, the MCS determination unit 303 increments the group index m, and repeats the same process for the next group. In the case of the second group, STAs corresponding to AID1, AID4, AID11, AID3, AID 9, AID13, and AID16 are selected in step S1617. Out of these, with reference to FIG. 10, STAs corresponding to AID3, AID9, AID13, and AID16 do not exceed 12 ms even if the MCS index is lowered. Therefore, the MCS determination unit 303 can lower the MCS index of the STAs corresponding to AID3, AID9, and AID13 from 1 to 0, and can lower the MCS index of the STA corresponding to AID16 from 3 to 2.

FIG. 17 illustrates a flow of frames communicated when the AP 100 assigns RUs for UL-OFDMA based on the processing illustrated in FIG. 16. It should be noted that points different from FIG. 10 are described. Compared to FIG. 10, a first UL-OFDM frame 1701 is the same as the UL-OFDM frame 1001, but a second UL-OFDM frame 1702 differs from the UL-OFDM frame 1002. That is, the data communication time of the UL-OFDM frame 1702 is the same as that of the UL-OFDM frame 1002, but the data communication time of the data of the STAs corresponding to AIDs 3 9, 13, and 16 becomes longer and the error tolerance is strengthened. As described above, according to the present embodiment, it is possible to increase the error tolerance of the transmission data of some STAs while increasing the frequency utilization efficiency.

Fifth Embodiment

A process in which the RU assignment unit 306 groups a plurality of STAs based on a Device Class of the STAs is described as the fifth embodiment. First, background regarding a Device Class is described. A Device Class is a class for classifying an STA according to an accuracy of a transmit power of the STA and an accuracy of a quality measurement. Specifically, the STAs are classified into two types, Class A and B, depending on an accuracy of absolute transmit power and an accuracy of RSSI (Receive Signal Strength Indicator) measurements of the STAs. More specifically, a Class A STA is an STA having a capability in which the accuracy of absolute transmit power and the accuracy of RSSI measurements are both ±3 dB or less. On the other hand, a Class B STA is an STA that has the capability of ±9 dB in accuracy of transmit power, ±5 dB in accuracy of RSSI measurements, and ±3 dB in accuracy of relative transmit power. Note that in IEEE 802.11ax, the STAs can notify their Device Class to an AP by means of HE PHY Capabilities information elements in the management frame, such as a Probe request and an Association request.

In environments where such STAs coexist, when signals of STAs with poor transmit power accuracy such as Class B are multiplexed by the OFDMA method, there is a possibility that there will be a large difference in reception powers from each STA at the AP that receives the multiplexed communication. This reception power difference may break the orthogonality of the OFDMA and increase the effect of inter-carrier interference. Especially, when the reception power is small, the influence is large, and the reception performance of the AP is deteriorates. By this, when an AP groups a plurality of STAs, an association in which Class A STAs and Class B STAs are distinguished is necessary. There are, for example, the following three methods for this association.

Class A STAs and B STAs are not selected for the same group.
  The multiplexing number of Class B STAs (number of destinations) is made to be smaller than that of Class A STAs.
  The MCSs of Class B are made to be of high tolerance (robustness).

Although the above is background related to the Device Class, the following two methods can be considered as examples of grouping methods in consideration of such background.

(1) A method for preferentially selecting STAs of the same Device Class when STAs of many data communication times are selected as in step S917 of FIG. 9B.
(2) A method of firstly considering a Device Class. For example, after completely separating the Class A STA group and the Class B STA group, RUs are assigned for UL-OFDMA as illustrated in FIG. 9A and FIG. 9B for the Class A STA group and the Class B STA group, respectively.

In this manner, according to the embodiment described above, by APs performing RU assignment for UL-OFDMA by grouping STAs based on the amounts of transmission buffers of each STA, it is possible to improve frequency utilization efficiency.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-203251, filed Oct. 29, 2018, which is hereby incorporated by reference herein in its entirety.

What is claimed is:

1. A communication apparatus comprising:
one or more processors; and
one or more memories including instructions that, when executed by the one or more processors, cause the communication apparatus to:
obtain, from each of a plurality of other communication apparatuses, an amount of buffered data of the each of the plurality of other communication apparatuses;
divide the plurality of other communication apparatuses into a plurality of groups of other communication apparatuses based on the amount of buffered data of each of the plurality of other communication apparatuses; and
assign, to each of the plurality of groups of other communication apparatuses obtained by dividing the plurality of other communication apparatuses based on the amount of buffered data of each of the plurality of other communication apparatuses, wireless frequency resources for which a shared data communication time is set.

2. The communication apparatus according to claim 1, wherein the one or more processors execute the instructions to further cause the communication apparatus to calculate a communication time for data of each of the plurality of other communication apparatuses based on the amounts of obtained buffered data, and
wherein the plurality of other communication apparatuses are divided into the plurality of groups of other communication apparatuses based on the calculated communication times.

3. The communication apparatus according to claim 2, wherein the one or more processors execute the instructions to further cause the communication apparatus to set the shared data communication times of the plurality of groups of other communication apparatuses based on the communication times of each of the plurality of other communication apparatuses belonging to a group.

4. The communication apparatus according to claim 2, wherein in a case where there is another communication apparatus whose communication time is longer than a predetermined value from among the communication times of each of the plurality of other communication apparatuses, the another communication apparatus is grouped so as to belong to a plurality of groups of other communication apparatuses.

5. The communication apparatus according to claim 2, wherein the one or more processors execute the instructions to further cause the communication apparatus to determine a modulation and coding scheme that can be applied to each of the plurality of other communication apparatuses, and
wherein the communication time of each of the plurality of other communication apparatuses is calculated based on the data amounts and the modulation and coding scheme of each of the plurality of other communication apparatuses.

6. The communication apparatus according to claim 5, wherein the one or more processors execute the instructions to further cause the communication apparatus to change the modulation and coding scheme that can be applied within an extent that the common data communication time is not exceeded in relation to the other communication apparatuses in a group of other communication apparatuses whose communication time is less than the common data communication time.

7. The communication apparatus according to claim 1, wherein the plurality of other communication apparatuses are grouped by a predetermined number.

8. The communication apparatus according to claim 7, wherein the predetermined number is a maximum number of units of wireless frequency resources that can be assigned to one group of other communication apparatuses.

9. The communication apparatus according to claim 1, wherein a plurality of wireless frequency resources are assigned to at least one of the plurality of other communication apparatuses belonging to a group of other communication apparatuses in a case where a number of data of the plurality of other communication apparatuses belonging to the group is smaller than a maximum number of units of wireless frequency resources assignable to one group.

10. The communication apparatus according to claim 1, wherein the plurality of other communication apparatuses are divided into the plurality of groups of other communication apparatuses based on accuracy of transmit power or accuracy of a quality measurement of the each of the plurality of other communication apparatuses.

11. The communication apparatus according to claim 1, wherein the one or more processors execute the instructions to further cause the communication apparatus to notify the plurality of other communication apparatuses of the shared data communication time and information on assignment of the wireless frequency resources.

12. The communication apparatus according to claim 1, wherein the wireless frequency resources are resources for performing communication by OFDMA (Orthogonal Frequency Division Multiple Access) by the plurality of other communication apparatuses.

13. The communication apparatus according to claim 1, wherein the communication apparatus is an access point supporting IEEE 802.11ax.

14. A communication method, the method comprising:
obtaining, from each of a plurality of other communication apparatuses, an amount of buffered data of the each of the plurality of other communication apparatuses;
dividing the plurality of other communication apparatuses into a plurality of groups of other communication apparatuses based on the amount of buffered data of each of the plurality of other communication apparatuses; and
assigning, to each of the plurality of groups of other communication apparatuses obtained by dividing the plurality of other communication apparatuses based on the amount of buffered data of each of the plurality of other communication apparatuses, wireless frequency resources for which a shared data communication time is set.

15. A non-transitory computer-readable storage medium storing a computer program for causing a computer to execute a communication method, the method comprising:

obtaining, from each of a plurality of other communication apparatuses, an amount of buffered data of the each of the plurality of other communication apparatuses;

dividing the plurality of other communication apparatuses into a plurality of groups of other communication apparatuses based on the amount of buffered data of each of the plurality of other communication apparatuses; and assigning, to each of the plurality of groups of other communication apparatuses obtained by dividing the plurality of other communication apparatuses based on the amount of buffered data of each of the plurality of other communication apparatuses, wireless frequency resources for which a shared data communication time is set.

* * * * *